US006841595B2

(12) United States Patent
Brizzolara et al.

(10) Patent No.: US 6,841,595 B2
(45) Date of Patent: Jan. 11, 2005

(54) PROCESS FOR THE PREPARATION OF PROTECTIVE COLLOID-STABILIZED, EMULSIFIER-FREE, AQUEOUS DISPERSIONS

(75) Inventors: Davide Brizzolara, Herten (DE); Herbert Vorholt, Haltern (DE)

(73) Assignee: PolymerLatex GmbH & Co. KG, Marl (DE)

( * ) Notice: Subject to any disclaimer, the term of this patent is extended or adjusted under 35 U.S.C. 154(b) by 244 days.

(21) Appl. No.: 10/187,851

(22) Filed: Jul. 3, 2002

(65) Prior Publication Data

US 2003/0022976 A1 Jan. 30, 2003

(30) Foreign Application Priority Data

Jul. 5, 2001 (DE) ........................................ 101 32 614

(51) Int. Cl.[7] ............................ C08J 3/00; C08K 3/00; C08K 5/05; C08L 31/00; C08L 57/02

(52) U.S. Cl. .................. 524/2; 524/5; 524/8; 524/387; 524/388; 524/499; 524/543; 524/556; 524/560; 524/561; 524/570; 524/571; 524/577; 524/557

(58) Field of Search ........................... 524/2, 387, 388, 524/5, 8, 499, 543, 556, 557, 560, 561, 571, 570, 577

(56) References Cited

U.S. PATENT DOCUMENTS 6,429,251 B2 * 8/2002 Mayer et al. ............... 524/459

FOREIGN PATENT DOCUMENTS

| | | |
|---|---|---|
| DE | 2 049 114 | 4/1972 |
| EP | 013 478 | 7/1980 |
| EP | 538 571 | 4/1993 |
| EP | 0 538 572 | 4/1993 |
| EP | 723 975 | 7/1996 |
| EP | 821 016 | 1/1998 |
| GB | 1 278 813 | 6/1972 |
| WO | 97/15603 | 5/1997 |
| WO | 99/16794 | 4/1999 |
| WO | 99/28360 | 6/1999 |

OTHER PUBLICATIONS

U.S. Appl. No. 10/187,851, filed Jul. 3, 2002, Brizzolara, et al.

U.S. Appl. No. 10/366,311, filed Feb. 14, 2003, Brizzolara et al.

* cited by examiner

*Primary Examiner*—Patrick D. Niland
(74) *Attorney, Agent, or Firm*—Oblon, Spivak, McClelland, Maier & Neustadt, P.C.

(57) ABSTRACT

Process for the preparation of protective colloid-stabilized, emulsifier-free, aqueous dispersions based on at least two monomers selected from vinylaromatics, 1,3-dienes and/or (meth)acrylates, in the presence of assistants and, if required, further comonomers in an amount of from 0.1% by weight to 20% by weight, based on the total amount of monomers, wherein at least 10% by weight of the total amount of water are added to the reaction vessel only after the monomers have been added to the reaction vessel and the conversion is at least 40%, based on 100% of the monomers.

21 Claims, No Drawings

PROCESS FOR THE PREPARATION OF PROTECTIVE COLLOID-STABILIZED, EMULSIFIER-FREE, AQUEOUS DISPERSIONS

BACKGROUND OF THE INVENTION

1. Field of the Invention

The present invention relates to a process for the preparation of protective colloid-stabilized, emulsifier-free, aqueous dispersions and their use.

2. Discussion of the Background

It has long been known that plastic dispersions can be used in building applications. Plastic dispersions are added to hydraulically setting systems for two reasons. Firstly, the addition of the dispersion facilitates the processibility of the building material by allowing the material to maintain a constant consistency over a relatively long period (cement stability). The second reason is that an improvement in mechanical properties, such as the flexural tensile strength and compressive strength of mortars, the adhesive power of mineral tile adhesives, etc., can be realized. The processibility and mechanical properties of a mortar mixture depend to a great extent on the water/cement ratio. In the case of a high water/cement ratio, the mortar is more fluid but the mechanical stability and the mechanical properties, such as flexural tensile strength and compressive strength, are poorer. The addition of a dispersion permits optimum adjustment of the system with regard to processibility and mechanical properties.

Owing to various advantages, dispersions are preferably used in the form of their dried redispersible powders in the building industry. The transport of aqueous dispersions has economic disadvantages because, in the case of a solids content of 50% by weight, water accounts for half the weight. The ratio of active substance to transport weight is simply too unfavorable. The transport of powders is more economical. Water is not added until use. The dried powder can be stored together with the other dry raw materials, such as sand, cement, etc. Aqueous dispersions have the disadvantage that they have to be stored separately. In addition, dispersions are sensitive to frost and must be stored in a heated room. During application, the amount of water in the dispersion must be taken into account, making accurate metering of water more difficult.

An established method for preparing polymer powders involves the spray-drying of an aqueous dispersion in a warm air or inert gas stream. The powder consists of the dispersion, a spraying assistant which improves redispersibility and prevents agglomeration during drying, and an inorganic solid which, as an anticaking agent, ensures the flowability of the powder during storage. Caking, polar macromolecular or low molecular weight compounds are used as the spraying assistant. In DE-A 20 49 114, polyvinyl alcohol (PVA) and melamine-formaldehyde-sodium sulfonate resin are used as a spraying additive. Finely milled silicates, talc, dolomite, diatomaceous earth, kieselguhr, colloidal silica gel, pyrogenically produced silica, etc. are suitable as anticaking agents. The amount of anticaking agent depends on the powder particle size and on the intended duration of storage.

It has been found that a powder has properties comparable with those of the base dispersion, such as, for example, cement stability in mortar, particularly when it is redispersible. This means that, after spray-drying, a powder having a mean particle size of from about 30 to 300 $\mu$m disintegrates virtually into the original particle size (primary particle size) of the dispersion on addition of water. However, the determination of the particle size or particle size distribution by light scattering methods is extremely difficult owing to the different scattered light intensity of large and small particles in the case of a broad particle size distribution. In the preparation of redispersible powders, the use of protective colloid-stabilized, emulsifier-free dispersions is advantageous. On steric stabilization by protective colloids, the repulsive forces extend further than in the case of stabilization by emulsifiers. In the case of steric stabilization, the particles approach one another on drying only to such an extent that the particles redisperse on addition of water and form a stable dispersion again (C. S. Hirtzel, R. Rajagoplan, Colloidal Phenomena, Advanced Topics Noyes Publications, New Jersey, 1985). In the case of emulsifier stabilization, the particles approach one another more closely on drying. On addition of water, the powder does not redisperse because the particles can no longer detach themselves from one another.

The polymer base of the dispersions which are used in building applications is varied. Thus, polyvinyl acetates, vinyl acetate/ethylene copolymers and vinyl acetate/vinyl ester copolymers are used. If high hydrolysis stability is required, styrene/acrylate, pure acrylate and styrene/butadiene copolymers are used. Styrene/butadiene copolymers are particularly suitable for hydraulically setting systems, owing to their high hydrolysis stability. Carboxylated styrene/butadiene copolymers moreover have good adhesion to polar substrates.

In the case of aqueous dispersions, acrylates and styrene/butadiene copolymers are preferably used. The powders, on the other hand, are virtually exclusively based on vinyl acetate/ethylene and vinyl acetate/vinyl ester copolymers because, for traditional and chemical reasons, these are stabilized by a protective colloid and therefore readily redispersible and cement-stable powders can be obtained therefrom. Owing to its high polarity, vinyl acetate is well stabilized by polar protective colloids. Partly hydrolyzed polyvinyl acetate (PVA) is predominantly used as the protective colloid because, owing to the similar polarity of PVA and vinyl acetate, PVA is a very good protective colloid for vinyl acetate-containing dispersions.

Dispersions with hydrophobic monomers, such as styrene or butadiene, which are stabilized with polar protective colloids, such as PVA or hydroxyethylcellulose (HEC), are difficult to prepare because they are very viscous (U.S. Pat. No. 4,670,505). These copolymers are as a rule therefore stabilized by more efficient ionic and nonionic emulsifiers, which result in a lower viscosity of the process. In order to be able to prepare a powder which is based on pure acrylate, styrene/acrylate or styrene/butadiene and which is technically equivalent to vinyl acetate-containing powders, it is advantageous if the dispersion is sterically stabilized by protective colloids and emulsifiers are not used. In addition to redispersibility, the protective colloid imparts rheological and adhesion properties to the dispersion which differ from those imparted by the emulsifier, which in addition adversely affects the water resistance of the dispersion. The preparation of protective colloid-stabilized hydrophobic copolymers is therefore of great interest.

Numerous processes for the preparation of protective colloid-stabilized, emulsifier-free dispersions based on hydrophobic copolymers, such as styrene/acrylate or styrene/butadiene, are known. Those processes make it possible to control the viscosity in the process but have disadvantages with regard to the process.

The viscosity of vinyl acetate/(meth)acrylate dispersions having a vinyl acetate content of <50%, can be reduced by stabilizing assistants, such as allyl alcohol (U.S. Pat. No. 4,670,505), propanol or ethylene glycol (British Patent 1278813), with the use of PVA or HEC as a protective colloid. In EP-A 013 478, the viscosity is reduced by water-miscible organic compounds, such as methanol and ethanol. The volatile organic compounds must be removed after the polymerization.

In EP-A 538 571, the total amount of protective colloid is initially introduced and a mixed initiator system consisting of an acidic peroxide and a redox system, or an acidic peroxide or a redox system alone, is used for regulating the viscosity of dispersions having a styrene content of >50% by mass and/or $C_1$-to $C_8$-alkyl (meth)acrylate. In addition, the viscosity can be reduced by using triethanolamine as a viscosity-regulating compound.

In EP-A 821 016 and EP-A 723 975, reference is made to the viscosity-regulating effect of polar comonomers which can undergo crosslinking during the polymerization itself, such as hydroxyethyl methacrylate and glycidyl (meth) acrylate, in the polymerization of styrene/acrylates with partly hydrolyzed polyvinyl acetate as a protective colloid. The polymerization of styrene/butadiene copolymers is unsuccessful.

WO 99/16794 states that a mixture of protective colloids which differ in surface tension can be used to prepare sterically stabilized styrene/butadiene copolymer dispersions which can be spray-dried to give a cement-stable, redispersible powder. One protective colloid has a surface tension of >40 mN/m in the form of a 2% strength aqueous solution, and the other has a surface tension of <40 mN/m in the form of a 2% strength aqueous solution. The styrene/butadiene dispersion thus prepared has a solids content of 47.0% in combination with a viscosity of 380 mPa·s (Brookfield viscometer, 20° C., 20 rpm) and a particle size of Dw=950 nm (Coulter LS 230, Dw). A cement mix is cement-stable with the powder only at a water/cement ratio of 1.03. The mechanical properties of a mortar, such as compressive strength and flexural tensile strength, are poorer if a large amount of water is used for the preparation. If only one protective colloid, having a surface tension of >40 mN/m, is used, the redispersibility of the powder prepared from the dispersion is unsatisfactory. If only one protective colloid, having a surface tension of <40 mN/m, is used, the cement stability of the powder prepared from the dispersion is unsatisfactory.

The preparation of a sterically stabilized dispersion of a styrene/butadiene copolymer which can be spray-dried to give a cement-stable powder, using only one protective colloid, is described in WO 99/28360 by initially introducing a part of the protective colloid and metering a part. The very large particle sizes of the dispersion from about 2.5 $\mu$m to 4.5 $\mu$m, are a disadvantage of this process. Experience has shown that dispersions having these particle sizes (substantially above 1 $\mu$m) do not have a long shelf life. The monomers must be partly initially introduced and partly metered. If all monomers are added during the polymerization, the conversion in the polymerization is not complete.

In WO 97/15603, a butadiene-containing, protective colloid-stabilized dispersion is prepared with the aid of a mercaptosilane and a partly hydrolyzed polyvinyl alcohol. A disadvantage of this process is the limitation to the mercaptosilane and the high costs of the silane. Moreover, emulsifiers are used.

SUMMARY OF THE INVENTION

Accordingly, an object of the invention is to provide a process for the preparation of emulsifier-free, protective colloid-stabilized, aqueous dispersions which overcomes the disadvantages of the prior art, in particular the regulation of the viscosity using organic solvents, emulsifiers, protective colloids or mercaptosilanes which are expensive to prepare, and permits the adjustment of the mean particle diameter below stable colloidal dimensions of 1000 nm, and moreover makes it possible to prepare readily redispersible and cement-stable plastics powders by drying the dispersion.

DETAILED DESCRIPTION OF THE PREFERRED EMBODIMENTS

The invention relates to a process for the preparation of protective colloid-stabilized, emulsifier-free, aqueous dispersions based on at least two monomers selected from vinylaromatics, 1,3-dienes and/or (meth)acrylates, in the presence of assistants and, if required, additional comonomers in an amount of from 0.1% by weight to 20% by weight, based on the total amount of monomers, wherein at least 10% by weight of the total amount of water is added to the reaction vessel only after the monomers have been added to the reaction vessel, and the conversion is at least 40%, based on 100% of the monomers.

Suitable vinylaromatics are styrene and methylstyrene, styrene being preferred.

Examples of 1,3-dienes are 1,3-butadiene and isoprene, 1,3-butadiene being preferred.

Preferred methacrylates or acrylates are-methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate and 2-ethylhexyl acrylate.

Suitable comonomers are hydroxy(C1-to C8-alkyl) (meth)acrylates, such as hydroxyethyl acrylate, hydroxyethyl methacrylate, hydroxypropyl acrylate or hydroxy (2-ethylhexyl) acrylate, preferably hydroxyethyl methacrylate; ethylenically unsaturated mono- and dicarboxylic acids, preferably acrylic acid, methacrylic acid, fumaric acid or maleic acid; ethylenically unsaturated carboxamides and carbonitriles, preferably acrylamide and acrylonitrile; mono-and diesters of fumaric acid and maleic acid, such as the diethyl and diisopropyl esters, and maleic anhydride, ethylenically unsaturated sulfonic acids and the salts thereof, preferably vinylsulfonic acid and 2-acrylamido-2-methylpropanesulfonic acid. Further examples are pre-crosslinking comonomers, such as polyethylenically unsaturated comonomers, such as, for example, divinyl adipate, diallyl maleate or allyl methacrylate, or postcrosslinking comonomers, for example N-methylolacrylamide (NMA), N-methylolmethacrylamide (NMMA) or esters of N-methylolacrylamide or of N-methylolmethacrylamide. Epoxy-functional comonomers, such as glycidyl methacrylate and glycidyl acrylate, are also suitable. Further examples are silicon-functional comonomers, such as acryloyloxypropyltri(alkoxy)-and methacryloyloxypropyltri (alkoxy)silanes, vinyltrialkoxysilanes and vinyl methyldialkoxysilanes, the alkoxy groups may be, for example, ethoxy and ethoxypropylene glycol ether radicals. In a preferred embodiment, the total amount of the monomers is added to the reaction vessel in the course of the polymerization, but a part of the monomers can also be initially introduced and a part metered.

Examples of assistants include protective colloids, initiators, pH regulators and molecular weight regulators.

Examples of protective colloids which can be used are polyvinyl alcohol, polyethylene glycol, modified starch and dextrins, cellulose derivatives, such as hydroxyethylcellulose, hydroxypropylcellulose or carboxymethylcellulose, polyvinylpyrrolidone, polystyrene-b-polyethylene oxide or polymethacrylate-b-polyethylene oxide block copolymers and casein. Polyvinyl alcohols having a degree of polymerization of from 200 to 2000 and a degree of hydrolysis of from 74 to 99.5%, in an amount of from 1 to 20 parts/100 parts of monomers, are preferably used. The protective colloid or a protective colloid mixture is initially introduced but may also be added divided between initially introduced mixture and feed or only in the feed during the polymerization.

The free radical initiators are peroxides, hydroperoxides, hydrogen peroxide, sodium peroxodisulfate, potassium peroxodisulfate or ammonium peroxodisulfate or azo compounds, alone or in combination. In a preferred embodiment of the invention, water-soluble sodium peroxodisulfate is initially introduced in combination with tert-butyl hydroperoxide in a total amount of from 0.01 to 2% by mass, based on the total amount of monomers. Water-soluble reducing agents, such as sodium sulfite or bisulfite, potassium sulfite or bisulfite or ammonium sulfite or bisulfite, sodium formaldehyde sulfoxylate or ascorbic acid, act as activators. The activator is preferably metered in an amount of from 0.01 to 2% by mass, based on the total amount of monomers, during the polymerization.

One or more buffers, such as, for example, sodium carbonate, sodium bicarbonate, tripotassium phosphate, ethylenediamine tetraacetate or nitrilotriacetic acid, are used for adjusting the pH during the polymerization. Tertiary amines can be used for support.

Regulating substances can be used for controlling the molecular weight during the polymerization. They are used in amounts of from 0.1 to 3% by mass, based on the total amount of monomers. The molecular weight regulators can be initially introduced, added or partly initially introduced and partly added. Examples of such substances are mercaptans, such as, for example, n-dodecyl mercaptan, tert-dodoecyl mercaptan, mercaptopropionic acid or methyl mercaptopropionate, or tertiary amines, such as, for example, triethanolamine. The polymerization temperature is from 30 to 90° C., preferably from 50 to 80° C.

The polymerization is preferably carried out in such a way that the total amount of protective colloid is initially introduced and the monomers and other components are added during the polymerization. However, it is also possible for the protective colloid and the monomers to be partly initially introduced and partly added, or for the protective colloid and the monomers to be completely initially introduced.

A part of the total amount of water is added only after the addition of the monomers, the conversion being at least 40%, based on 100% of monomer at the time when the addition of water is started. This is in contrast to the prior art where water is preferably initially introduced or water is added simultaneously with the monomers, in order to keep the viscosity low by the dilution effect. Preferably, 20% by weight, based on the total amount of water, of the water is added in one hour after all monomers have been added to the reaction container and the conversion is at least 40%, based on 100% of monomers. It is also possible to add further protective colloid with the water which is added after the addition of the monomers. In a further embodiment, from 10 to 60% by weight of the total amount of water or from 10 to 60% by weight of the total amount of water, together with protective colloid, are added to the reactor simultaneously with the addition of the monomers, and a further 10 to 40% by weight of water, if required with protective colloid, based on the solids content of the dispersion, are added to the reactor after monomer addition is complete. The amount of protective colloid dissolved in the water is from 0.5 to 15% by weight, based on the solids content of the dispersion. The amount of water which is introduced into the reactor after the monomer addition is complete and the time of addition are such that the viscosity decreases. Depending on the rate of addition, the amount of water required for this purpose is from 10 to 40% by weight, based on the total amount of water, and preferably 20% by weight if the addition is effected in the course of one hour. It was surprising that the process according to the invention has a positive effect on the viscosity and the cement stability of the dispersion and on the redispersibility and the cement stability of the powder prepared therefrom by spray-drying.

The ratio of solid to water is established to give a solids content of from 30 to 70%, preferably from 40 to 60%, for the prepared dispersion.

After the end of the monomer addition, the polymerization can be continued to a lower residual monomer content in a known manner by subsequent initiation.

The polymer has a glass transition temperature of from −40 to +100° C., preferably from −20 to +50° C. The composition of the copolymer is chosen so that the above-mentioned glass transition temperature is reached. The comonomer fraction must be taken into account. The approximate Tg can be calculated in advance by means of the Fox equation. According to Fox T. G., Bull. Am. Physics Soc. 1, 3, page 123 (1956), the following is true: $1/Tg=x1/Tg1+x2/Tg2+\ldots+xn/Tgn$, where xn is the mass fraction (% by weight/100) of the monomer n and Tgn is the glass transition temperature in degrees Kelvin of the homopolymer of the monomer n. Tg values for homopolymers appear in Polymer Handbook, 2nd Edition, J. Wiley & Sons, New York (1975). The glass transition temperature Tg of the polymer can be determined in a known manner by means of differential scanning calorimetry (DSC).

The dispersions according to the invention and powders prepared therefrom are suitable for the preparation of adhesive compositions, such as, for example, tile adhesives, filling compounds, mortars, such as, for example, cement mortars, lime mortars, ready-made mortars, renders and gypsum building materials, and emulsion paints.

The invention also relates to protective colloid-stabilized, emulsifier-free, aqueous dispersions based on vinylaromatics and 1,3-dienes and, if required, further comonomers in an amount of from 0.1% by weight to 20% by weight, based on the total amount of monomers, obtained by reacting the monomers in the presence of assistants, at least 10% by weight of the total amount of water being added to the reaction vessel only after the monomers have been added to the reaction vessel, and the conversion being at least 40%, based on 100% of the monomers. The preparation and the starting materials are described in detail above.

The examples which follow serve to further illustrate the invention and are not intended to limit the invention. The experimental results are listed in table 1.

Spray-drying of the dispersions

The dispersions were mixed with 10 parts of PVA (as an approx. 20% strength solution)/100 parts of dispersion solid and were adjusted to a solids content of 35%. The latex was dried in a cocurrent air stream in a spray-drying apparatus. 10%, (based on solids content) of a talc/dolomite mixture (1:1) was used as an anticaking agent and was added during the drying, simultaneously with the feed.

Particle size after redispersion in water with and without ultrasonic treatment

The powder was dispersed in water and diluted to a concentration of 0.1%. The particle size distribution was measured using a Microtrac X-100 from Malvern before and after ultrasonic treatment for 900 s.

Determination of the mortar properties of the dispersion and of the powders prepared therefrom The dispersion or the dispersion powder was tested for processibility in a mortar (400 g of 2–4 mm sand, 600 g of 1 to 2 mm sand, 1000 g of 0.5 to 1.2 mm sand, sand H 33, cement PZ 35 F) with a water/cement ratio (W/C) of 0.38 or 0.46 and a plastics/cement ratio (P/C) of 0.1 and 5 g of the antifoam Bevaloid 6352 DD. According to DIN 18555, this measurement is determined as slump. A mortar cake which, if required, is provided with polymer dispersion or polymer powder is formed in the center of a glass plate with the aid of a settling funnel. The mortar cone or mortar cake is then spread as a result of the vibration on striking the plate by means of 15 upward strokes (1 stroke/s). The diameter of the slumped cake, measured after 0, 20, 40 and 60 min, gives the slump of the mortar, which is a measure of the cement stability or the processibility of a mortar. Mortar prisms on which the flexural tensile strength and compressive strength were measured were produced. The measurements were carried out after storage in water for 7 days and dry storage for 21 days. The air pore content of the mortar mix was measured using a B 2030 air content tester from Form and Test Seidner, according to DIN 18555. The vinyl acetate/ethylene copolymer powder Vinnapas RE 545 Z, which represents the technical standard in the case of the commercial powders, was also tested as a standard sample. The test results are summarized in table 1.

Preparation of the dispersions according to the invention

EXAMPLE 1

1622 g of water, 1058 g of an 18.9% strength PVA solution (degree of hydrolysis about 87%), 4 g of EDTA and 8 g of triethanolamine were initially introduced into a 12 liter pressure-resistant autoclave having a paddle stirrer and jacket heating and were heated to 70° C. When the internal reactor temperature remains constant, 4 g of sodium peroxodisulfate and 34.3 g of tert-butyl hydroperoxide (70% strength) are added in one shot. 5 minutes thereafter, the metering of the feeds is started. 2400 g of styrene, 16 g of tert-dodecyl mercaptan, 200 g of hydroxyethyl methacrylate and 1400 g of butadiene are introduced into the reactor in five hours. Parallel with this, 870 g of a 2.8% strength sodium formaldehyde sulfoxylate solution is added in the course of seven hours. After the end of the monomer metering, 11.4 g of tert-butyl hydroperoxide (70% strength) are added in one shot. After the end of the addition of tert-butyl hydroperoxide, 858 g of water are added in the course of one hour in the fifth hour at a conversion of 46%, based on 100% of monomer. After the end of the addition of water, the polymerization reactor was left alone for a further four hours while stirring. The reactor was then cooled to room temperature in 20 min. The Brookfield viscosity of the deodorized dispersion is 1560 mPa·s (spindle 3, 30 rpm) at a solids content of 50.6%. After the polymerization, the solids content was 48.3%. The particle size was measured using a Coulter Nano-Sizer and gave 471 nm. The particle size of the powder dispersed in water is $D_{50}$=37 $\mu$m without ultrasonic treatment and $D_{50}$=9.12 $\mu$m after ultrasonic treatment for 900 s (Microtrac-X100). A mortar mix can be processed with the powder prepared from the dispersion by drying, at a water/cement ratio (W/C) of 0.38, to give a mortar cake, which however shows no slump. At a W/C ratio of 0.46, the mortar mix has a higher slump (table 1).

EXAMPLE 2

667 g of water, 1225 g of a 19.6% strength PVA solution (degree of hydrolysis about 87%), 4 g of EDTA and 8 g of triethanolamine were initially introduced into a 12 liter pressure-resistant autoclave having a paddle stirrer and jacket heating and were heated to 70° C. When the internal reactor temperature remains constant, 4 g of sodium peroxodisulfate and 34.3 g of tert-butyl hydroperoxide (70% strength) are added in one shot. Parallel with this, 874 g of water are added in the course of one hour. 5 minutes after the sodium peroxodisulfate and tertbutyl hydroperoxide addition, the metering of the feeds is started. 2400 g of styrene, 16 g of tert-dodecyl mercaptan, 280 g of hydroxyethyl methacrylate and 1400 g of butadiene are introduced into the reactor in five hours. Parallel with this, 870 g of a 2.8% strength sodium formaldehyde sulfoxylate solution are added in the course of seven hours. After the end of the monomer metering, 11.4 g of tert-butyl hydroperoxide (70% strength) are added in one shot. After the end of the addition of tertbutyl hydroperoxide, 858 g of water are added in the course of one hour in the fifth hour at a conversion of 44%, based on 100% of monomer. After the end of the addition of water, the polymerization reactor was left alone for a further four hours while stirring. The reactor was then cooled to room temperature in 20 min. The Brookfield viscosity of the dispersion is 1460 mPa·s at a solids content of 50.5% (47.8% after the polymerization) and a particle size of 461 nm (Coulter Nano-Sizer). Without ultrasonic treatment, the particle size of the powder dispersed in water is $D_{50}$=29.23 $\mu$m. After ultrasonic treatment for 900 s, the powder has disintegrated to an average particle size $D_{50}$ =8.20 $\mu$m. A mortar mix with the powder prepared from the dispersion by drying is cement-stable at a water/cement ratio of 0.38.

EXAMPLE 3

861 g of water, 1005 g of a 19.9% strength PVA solution (degree of hydrolysis about 87%), 4 g of EDTA and 8 g of triethanolamine were initially introduced into a 12 liter pressure-resistant autoclave having a paddle stirrer and jacket heating and was heated to 70° C. When the internal reactor temperature remains constant, 4 g of sodium peroxodisulfate and 34.3 g of tert-butyl hydroperoxide (70% strength) are added in one shot. Parallel with this, 865 g of 4.5% strength by weight PVA solution are added in the course of one hour. 5 minutes after the sodium peroxodisulfate and tert-butyl hydroperoxide addition, 2400 g of styrene, 16 g of tert-dodecyl mercaptan, 280 g of hydroxyethyl methacrylate and 1400 g of butadiene are introduced into the reactor in five hours. Parallel with this, 870 g of a 2.8% strength sodium formaldehyde sulfoxylate solution are added in the course of seven hours. After the end of the monomer metering, 11.4 g of tert-butyl hydroperoxide (70% strength) are added in one shot in the fifth hour. After the end of the tert-butyl hydroperoxide addition, 865 g of a 4.5% strength by weight PVA solution are added in the course of one hour. The conversion is 47%, based on 100% of monomers, at the beginning of the addition. After the end of the addition of the PVA solution, the polymerization reactor was left alone for a further four hours while stirring. The reactor was then cooled to room temperature in 20 min. The Brookfield viscosity of the dispersion is 1500 mPa·s at a solids content of 50.5% after the polymerization and a particle size of 539 nm (Coulter Nano-Sizer). A mortar mix with the powder prepared from the dispersion by drying is cement-stable at a water/cement ratio of 0.38. The powder disintegrates in water to an average particle size of $D_{50}$–31.95 μm and, after ultrasonic treatment for 900 s, to an average particle size of $D_{50}$=8.88 μm. At a W/C ratio of 0.38, the powder is cement-stable.

COMPARATIVE EXAMPLE 1

This batch was prepared analogously to example 1, except that the water metering after the monomer addition was dispensed with 2533 g of water, 1015 g of 19.7% strength PVA solution (degree of hydrolysis about 87%), 4 g of EDTA, 12 g of sodium carbonate and 8 g of triethanolamine were initially introduced into a 12 liter pressure-resistant autoclave having a paddle stirrer and jacket heating and were heated to 70° C. When the internal reactor temperature remains constant, 4 g of sodium peroxodisulfate and 34.3 g of tert-butyl hydroperoxide (70% strength) are added in one shot. 5 minutes thereafter, the metering of the feeds is started. 2460 g of styrene, 16 g of tert-dodecyl mercaptan, 250 g of hydroxyethyl methacrylate and 1340 g of butadiene are introduced into the reactor in five hours. Parallel with this, 870 g of a 2.8% strength sodium formaldehyde sulfoxylate solution are added in the course of seven hours. After the end of the monomer metering, 11.4 g of tert-butyl hydroperoxide (70% strength) are added in one shot. The polymerization reactor was then left alone for a further five hours while stirring. The reactor was then cooled to room temperature in 20 min. The batch was not worked up because it was very viscous and contained specks.

Comparative example 1 shows that a protective colloid-stabilized, emulsifier-free dispersion having a solids content of about 50% can be prepared only by the addition of water after monomer addition is complete and at a conversion of at least 40%. If the water is added in the initially introduced mixture or even beforehand, parallel with the monomer addition, or before a conversion of 40%, based on 100% of monomer, is reached, the viscosity of the end product is much higher. It is frequently observed that, after removal of the residual monomers, the dispersions thus prepared coagulate.

COMPARATIVE EXAMPLE 2

The dispersion was prepared analogously to comparative example 2, but in addition the theoretical solids content was reduced from 50% to 40%. A latex having a solids content of 39.7%, a Brookfield viscosity of 175 mPa·s (spindle 2, 30 rpm) and a particle size of 267 nm (Coulter Nano-Sizer) was thus obtained. Without ultrasonic treatment, the average particle size of the redispersed powder is $D_{50}$=66.72 μm. After ultrasonic treatment for 900 s, the average particle size is unchanged at $D_{50}$=63.77 μm. The air pore content of the mortar mix after the addition of the dispersion is 11% and hence higher than in the case of examples 1 to 3. With the powder prepared therefrom and at a water/cement ratio of 0.38 and 0.46, no mortar cake can be produced because the mortar mix is too dry. Comparative example 2 shows that the addition of water after the monomer addition is complete improves the cement stability and redispersibility of the powder. A more dilute procedure through reduction of the solids content from 50% to 40% permits the preparation of an emulsifier-free dispersion, that the powder thereof is substantially poorer in terms of the cement stability and redispersibility. Moreover, the preparation of the dispersion having a lower solids content is less economical.

In the case of the vinyl acetate/ethylene copolymer powder Vinnapas RE 545 Z, the redispersibility in water with ultrasonic treatment is better than in the case of the powders according to the invention (table 1). In the cement stability, however, the powders according to the invention are equivalent.

The preparation process according to the invention makes it possible to polymerize protective colloid-stabilized, emulsifier-free dispersions based on nonpolar and relatively hydrophobic monomers. The powder obtained by spray-drying the dispersion has good redispersibility and cement stability.

German patent application 101 32614.9 filed on Jul. 5, 2001 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

TABLE 1

| | | | Summary of the test results for the processing properties of the mortar with addition of the polymer dispersions and polymer powders | | | | | | | |
|---|---|---|---|---|---|---|---|---|---|---|
| | W/C ratio | Air pore content (%) | 0 min | 20 min | 40 min | 60 min | Flexural tensile strength (N/mm²) | Compressive strength (N/mm²) | Particle size (μm) 0 min/15 min Ultrasonics | |
| Ex. 1 Dispersion | 0.38 | 7.0 | 140 | 120 | 120 | 110 | 14.0 | 54.8 | | |
| Ex. 1 Powder | 0.38 | 7.0 | 100 | 100 | 100 | 100 | | | 37.0 | 9.12 |
| Ex. 1 Powder | 0.46 | 7.5 | 170 | 140 | 120 | 120 | | | 37.0 | 9.12 |
| Ex. 2 Dispersion | 0.38 | 7.0 | 140 | 130 | 120 | 120 | 16.7 | 57.5 | | |
| Ex. 2 Powder | 0.38 | 7.5 | 130 | 110 | 105 | 100 | 15.2 | 61.9 | 29.23 | 8.20 |
| Ex. 3 Dispersion | 0.38 | 7.5 | 140 | 120 | 120 | 120 | 16.3 | 55.5 | | |
| Ex. 3 Powder | 0.38 | 7.0 | 130 | 110 | 110 | 110 | 14.4 | 62.5 | 31.95 | 8.88 |
| Comp. ex. 1 Dispersion | coagulates | | | | | | | | | |
| Comp. ex. 2 Dispersion | 0.38 | 11 | 170 | 150 | 130 | 130 | 11.6 | 48.1 | | |
| Comp. ex. 2 Power | 0.38 | | | | | | | | 66.72 | 63.77 |
| Vinnapas RE 545 Z Powder | 0.38 | 7.0 | 120 | 110 | 105 | 105 | 14.0 | 55.4 | 122.82 | 1.10 |

What is claimed is:

1. A process for preparing an aqueous dispersion, comprising mixing at least two monomers with a mixture comprising water, a protective colloid and at least one assistant, to form a reaction mixture, reacting the reaction mixture, then adding water to the reaction mixture, wherein the monomers are selected from the group consisting of vinyl aromatics, 1,3-dienes, (meth)acrylates and mixtures thereof, and at least 10% of the water, based on a total amount of water added, is added to the reaction mixture after the monomers have been added to the reaction mixture, and at least 40% of the monomers, based on the total amount of the monomers added, have been reacted, and wherein all water has been added through completion of the reaction.

2. The process of claim 1, wherein at least one further comonomer is mixed in an amount of from 0.1% to 20% by weight, based on the total amount of monomers, to form the reaction mixture.

3. The process as claimed in claim 1, wherein the vinylaromatic monomers are styrene and/or methylatyrene.

4. The process as claimed in claim 1, wherein the 1,3-diene monomers are 1,3-butadiene and/or isoprene.

5. The process as claimed in claim 1, wherein the (meth) acrylate monomers have 1 to 15 carbon atoms.

6. The process as claimed in claim 5, wherein the methacrylates are selected from the group consisting of methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate and 2-ethylhexyl acrylate.

7. The process as claimed claim 1, wherein the at least one assistant is selected from the group consisting of an initiator, a pH regulator and a molecular weight regulator.

8. The process as claimed claim 1, wherein the protective colloid is selected from the group consisting of a polyvinyl alcohol, polyethylene glycol, modified starch, a dextrin, a cellulose derivative, polyvinylpyrrolidone, a polystyrene-b-polyethylene oxide block copolymer, a polymethacrylate-b-polyethylene oxide block copolymer, casein and mixtures thereof.

9. The process as claimed in claim 1, wherein the assistant comprises at least an initiator which is selected from the group consisting of a peroxide, an hydroperoxide, hydrogen peroxide, sodium peroxodisulfate, potassium peroxodisulfate, ammonium peroxodisulfate, an azo compound and mixture thereof.

10. The process as claimed in claim 1, wherein the assistant comprises at least a pH regulator which is selected from the group consisting of sodium carbonate, sodium bicarbonate, tripotassium phosphate, ethylenediamine tetraacetate, nitrilotriacetic acid and mixtures thereof.

11. The process as claimed in claim 1, wherein the assistant comprises at least a molecular weight regulator which is selected from the group consisting of n-dodecyl mercaptan, tert-dodecyl mercaptan, mercaptopropionic acid, methyl mercaptopropionate, triethanolamine and mixtures thereof.

12. The process as claimed in claim 2, wherein the comonomers are selected from the group consisting of an hydroxy (C1- to C8-alkyl) (meth)acrylate, an ethylenically unsaturated monodicarboxylic acid, an ethylenically unsaturated dicarboxylic acid, an ethylenically unsaturated carboxamide, an ethylenically unsaturated carbonitrile, a fumaric acid diester, a maleic acid diester, an ethylenically saturated sulfonic acid, a salt of an ethylenically unsaturated sulfonic acid, an ethylenically precrosslinking comonomer, a postcrosslinking comonomer, an epoxy-functional comonomer, a silicon-functional comonorner and mixtures thereof.

13. The process as claimed in claim 12, wherein the comonomers are selected from the group consisting of hydroxyethyl acrylate, hydroxyethyl methacrylate, hydroxypropyl acrylate, hydroxy(2-ethylhexyl) acrylate, acrylic acid, methacrylic acid, fumaric acid, maleic acid, acrylamide, acrylonitrile, a diethyl estes of fumaric acid, a diisopropyl ester of fumaric acid, a diethyl ester of maleic acid, a dipropyl ester of maleic acid, maleic anhydride, vinylsulfonic acid, 2-acrylamido-methylpropanesulfonic acid, divinyl adipate, diallyl maleate, allyl methacrylate, N-methylolacrylamide (NMA), N-methylolmethacrylamide (NMMA), an ester of N-methylol acrylamide, an ester of methylolmethacrylamide, glycidyl methacrylate, glycidyl acrylate, an acryloyloxypropyltri(alkoxy)silane, a methacryloyloxypropyltri(alkoxy)silane, a vinyltrialkoxysilane, a vinylmethyldialkoxysilane and mixtures thereof.

14. The process as claimed in claim 1, wherein a reaction temperature is from 30 to 90° C.

15. The process as claimed in claim 1, further comprising adjusting a ratio of solid to water from 30 to 70%.

16. The process as claimed in claim 1, wherein the total amount of protective colloid is introduced first and the monomers and the assistants are added during the reaction.

17. An aqueous dispersion prepared by mixing at least two monomers with a mixture comprising water, a protective colloid and at least one assistant, to form a reaction mixture, reacting the monomers in the reaction mixture, then adding water to the reaction mixture, wherein the monomers are selected from the group nsisting of a yin aromatic, a 1,3-diene, a (meth)acrylate, and mixtures thereof, and at least 10% of the water, based on the total amount of water added, is added to the reaction mixture after the monomers have been added to the reaction mixture, and at least 40% of the monomers, based on the total amount of monomers added, have been reacted.

18. The aqueous dispersion of claim 17, wherein the aqueous dispersion further comprises from 0.1% to 20% by weight of at least one further comononer based on the total amount of monomers.

19. A process for the preparation of adhesive composition, comprising mixing the aqueous dispersion obtained by the process as claimed in claim 1 with a hydraulically setting material.

20. A redispersible powder obtained by drying the aqueous dispersion prepared by the process as claimed in claim 1.

21. A hydraulically setting composition obtained by mixing the aqueous dispersion of claim 17 with a cement or a precursor to a hydraulically setting material.

* * * * *

UNITED STATES PATENT AND TRADEMARK OFFICE

CERTIFICATE OF CORRECTION

PATENT NO. : 6,841,595 B2
DATED : January 11, 2005
INVENTOR(S) : Davide Brizzolara et al.

It is certified that error appears in the above-identified patent and that said Letters Patent is hereby corrected as shown below:

Title page,
Item (73), delete in its entirety and replace with -- (73) Assignee: Polymer Latex GmbH & Co. KG, Marl (DE) --;

Column 11,
Line 24, "viny-" should read -- vinyl- --;
Line 25, "laromatic" should read -- aromatic --;
Line 25, "methylatyrene" should read -- methylstyrene --;
Line 28, "(meth)" should read -- (meth)- --;
Lines 36 and 39, "claimed claim" should read -- claimed in claim --;
Line 41, "alcohol, polyethylene" should read -- alcohol, a polyethylene --;
Line 51, "mixture" should read -- mixtures --.

Column 12,
Line 5, "saturated" should read -- unsaturated --;
Line 8, "comonorner" should read -- comonomer --;
Line 15, "estes" should read -- ester --;
Line 40, "nsist-" should read -- consist --;
Line 41, "yin" should read -- vinyl --;

Column 12,
Line 50, "comononer" should read -- comonomer --;
Line 52, "of adhesive" should read -- of an adhesive --.

Signed and Sealed this

Tenth Day of May, 2005

JON W. DUDAS
*Director of the United States Patent and Trademark Office*